United States Patent [19]

Richter

[11] Patent Number: 5,053,662

[45] Date of Patent: Oct. 1, 1991

[54] ELECTROMAGNETIC DAMPING OF A SHAFT

[75] Inventor: Eike Richter, Cincinnati, Ohio

[73] Assignee: General Electric Company, Cincinnati, Ohio

[21] Appl. No.: 510,809

[22] Filed: Apr. 18, 1990

[51] Int. Cl.⁵ .......................................... H02K 7/09
[52] U.S. Cl. ................... 310/90.5; 310/68 B; 290/40 A; 318/702
[58] Field of Search .............. 310/90.5, 51, 68 B; 290/40 A; 318/702, 163

[56] References Cited

U.S. PATENT DOCUMENTS

| | | | |
|---|---|---|---|
| 3,937,533 | 2/1976 | Veillette | 308/10 |
| 4,141,604 | 2/1979 | Habermann | 310/90.5 |
| 4,417,772 | 11/1983 | Robinson | 310/90.5 |
| 4,444,444 | 4/1984 | Benedetti | 310/90.5 |
| 4,533,031 | 4/1986 | Brunet et al. | 318/632 |
| 4,620,752 | 11/1986 | Fremerey et al. | 310/90.5 |
| 4,626,754 | 12/1986 | Habermann et al. | 318/460 |
| 4,642,500 | 2/1987 | Higuchi et al. | 310/90.5 |
| 4,686,404 | 8/1987 | Nakazeki et al. | 310/90.5 |
| 4,707,650 | 11/1987 | Bose | 318/685 |
| 4,723,735 | 2/1988 | Eisenhaure et al. | 244/165 |
| 4,734,606 | 3/1988 | Hajec | 310/90.5 |
| 4,896,088 | 1/1990 | Jahns | 318/696 |
| 4,916,346 | 4/1990 | Kliman | 310/216 |

FOREIGN PATENT DOCUMENTS 0023801 2/1981 European Pat. Off. .......... 310/68 B

Primary Examiner—Steven L. Stephan
Assistant Examiner—Thomas M. Dougherty
Attorney, Agent, or Firm—Jerome C. Squillaro

[57] ABSTRACT

Electromagnetic damping techniques for use in slowing down the shaft to a gas turbine based on various electrical machine concepts. A rotor may be mounted on an outer race of a bearing through which the shaft extends. The damper may use a permanent magnet (PM) design with permanent magnets mounted to the rotor. Alternately, the rotor and stator may be designed to operate upon a switched reluctance motor (SRM) design. Instead of having the rotor mounted to the outer race, an alternate arrangement may use a rotor mounted directly to the gas turbine shaft in which case the rotor and a corresponding stator serve both as a damper and as an electrical generator for providing the usual electrical generation functions from the gas turbine shaft.

12 Claims, 7 Drawing Sheets

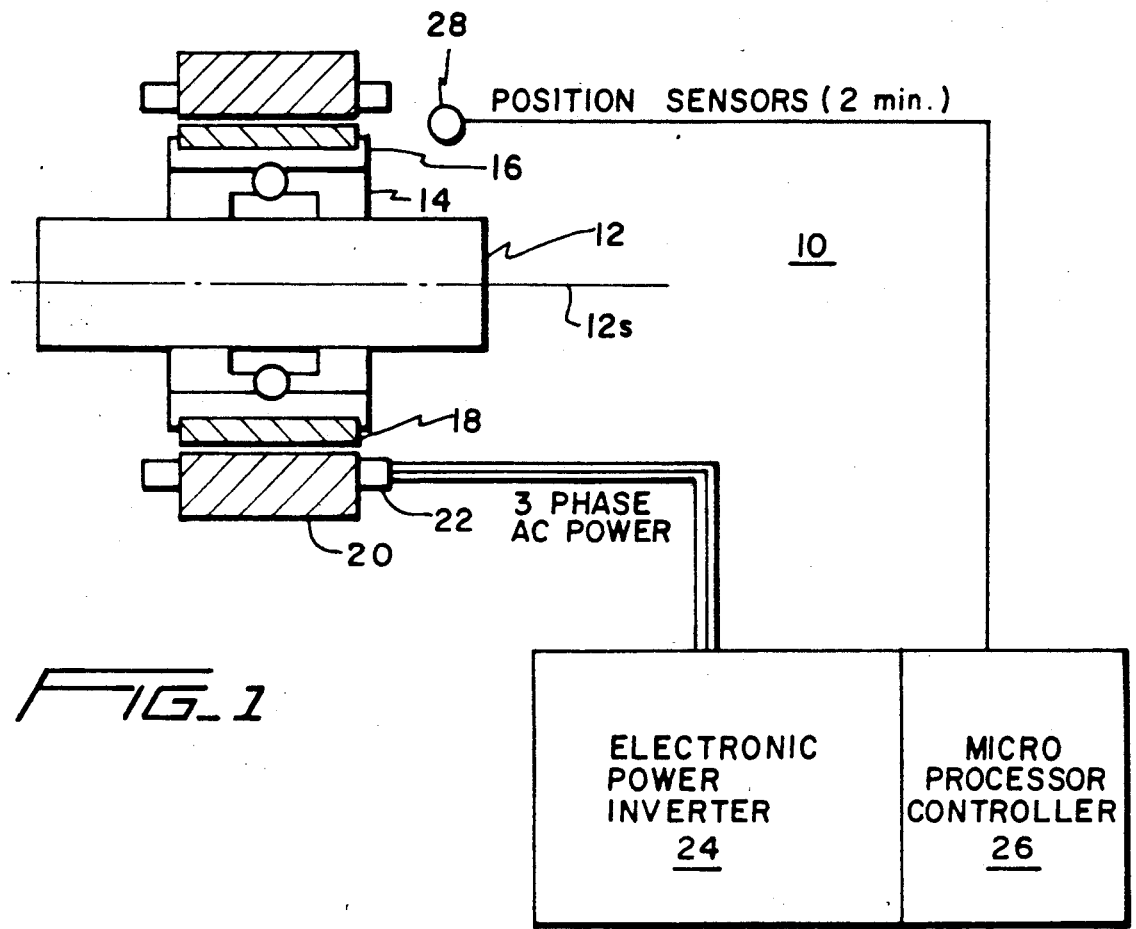
FIG_1
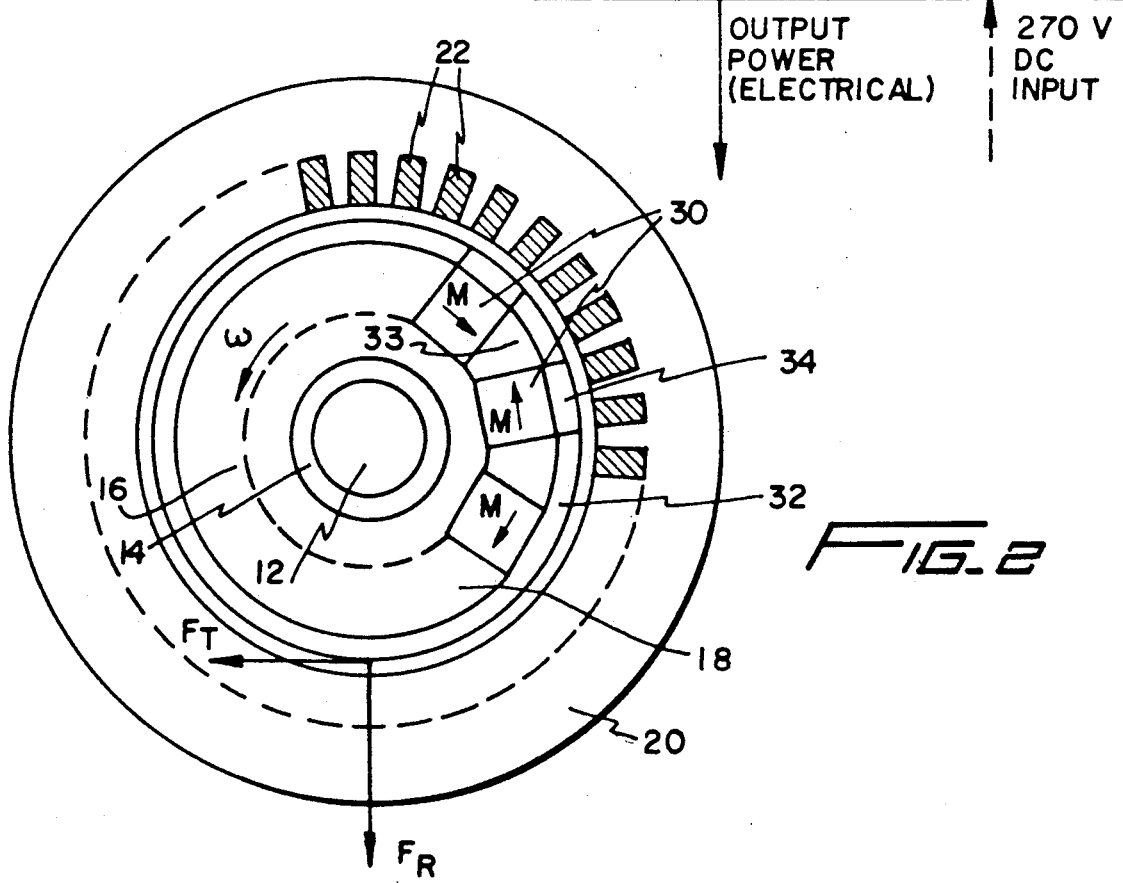
FIG_2

IDEALIZED TORQUE VERSUS TORQUE ANGLE
FOR PM MACHINE
(CURRENT ANGLE WITH RESPECT TO
ROTOR POSITION)

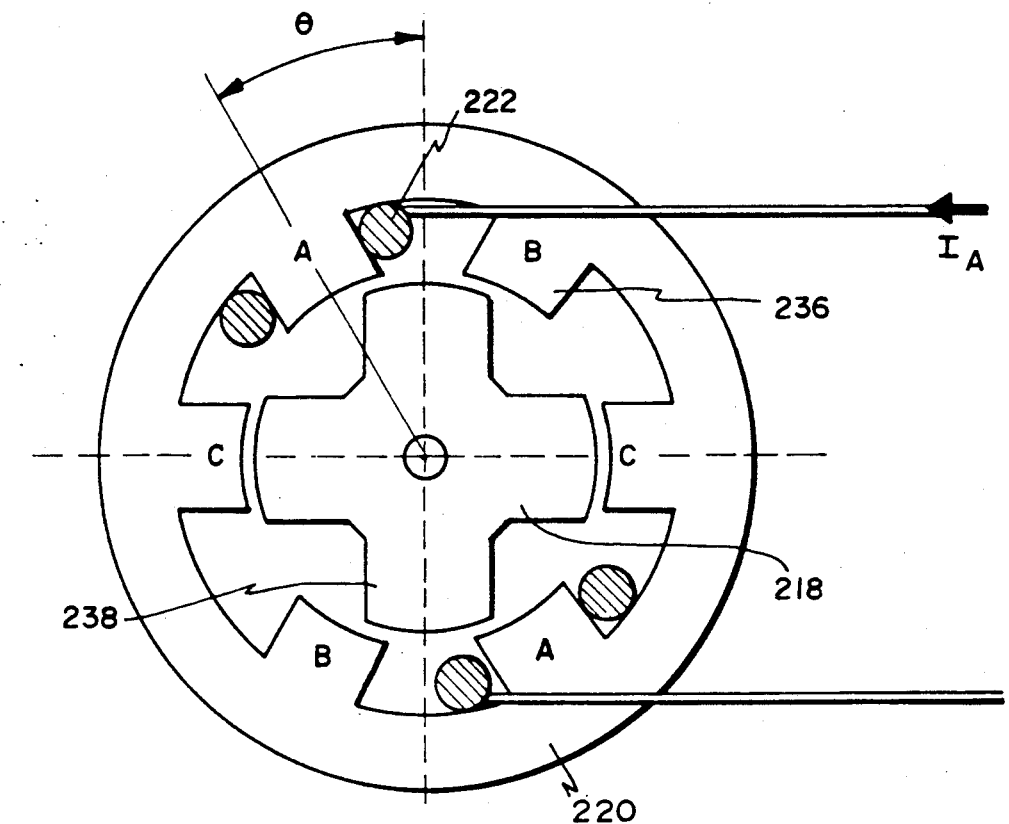
FIG.5
FIG.6
INDUCTANCE VARIATION VERSUS ROTOR ANGLE
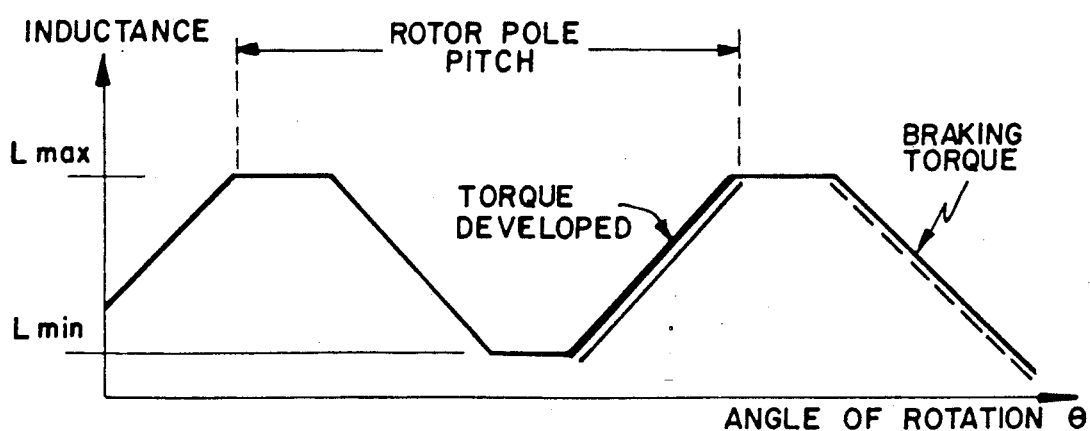

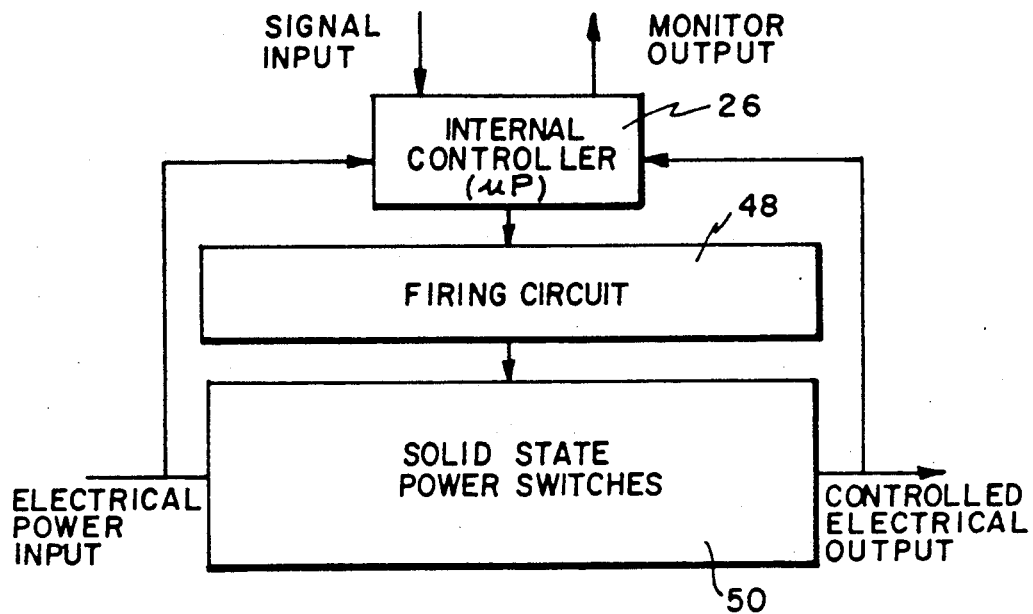
FIG_7
FIG_10
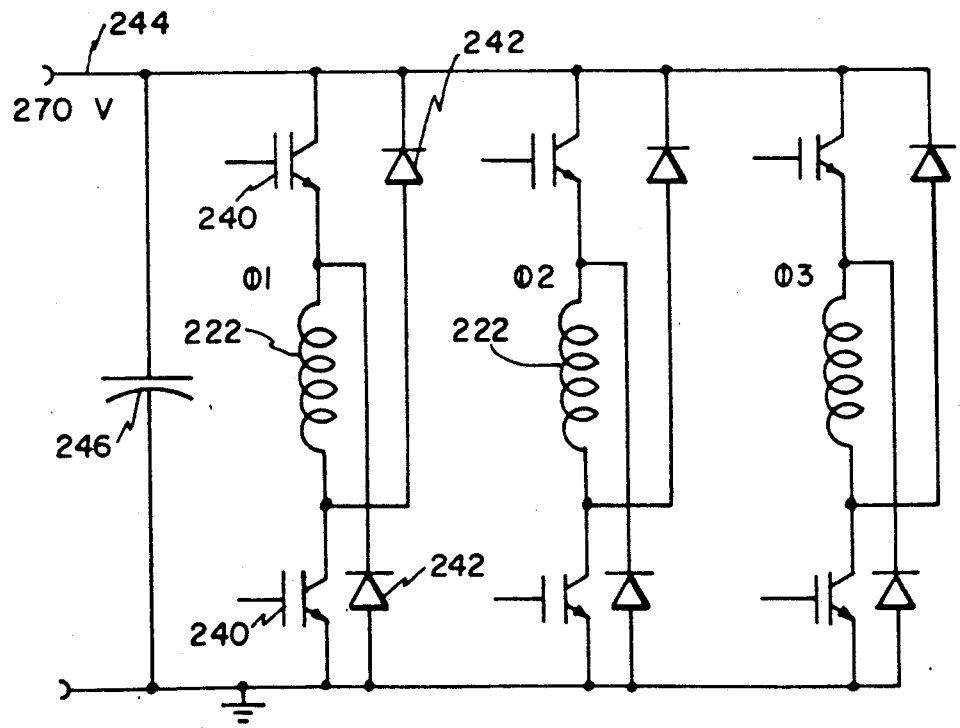

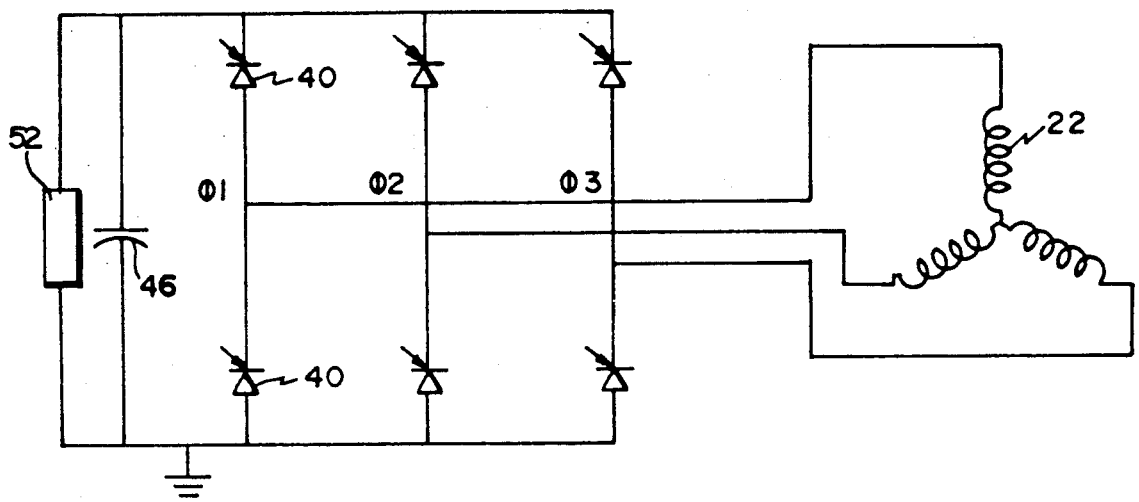
FIG_8
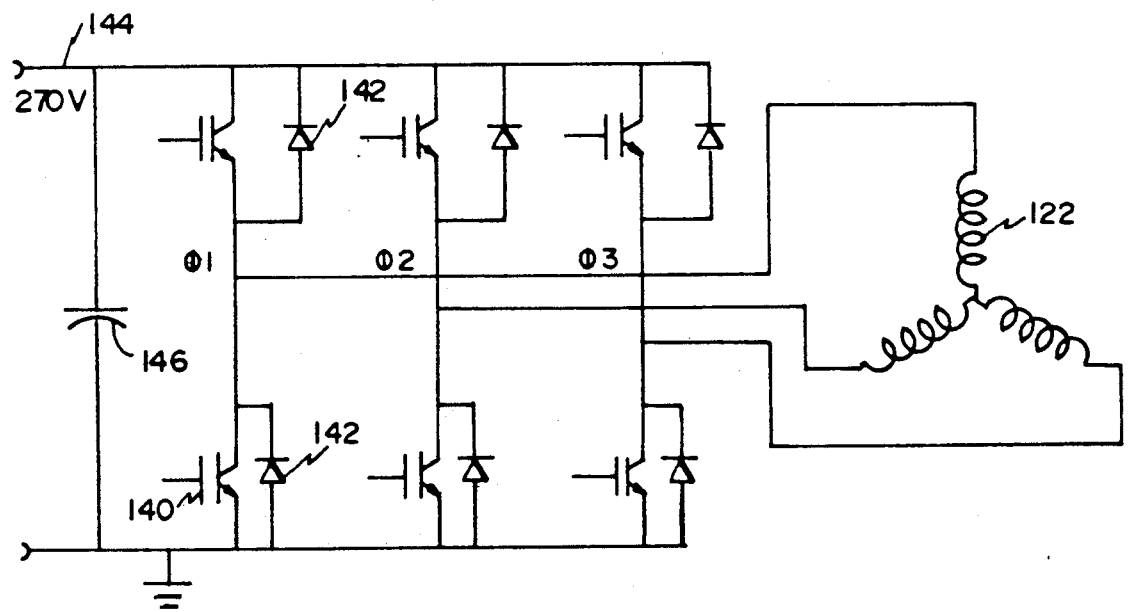
FIG_9

ELECTROMAGNETIC DAMPING OF A SHAFT

BACKGROUND OF THE INVENTION

The present invention relates to dampers for bearings to apply braking forces to the shaft system of a gas turbine engine. More specifically, the present invention relates to damping using electrical machine concepts.

Dampers have been commonly used to apply braking forces to the orbiting shaft system of a gas turbine. The gas turbine may, for example, be an aircraft engine. Often the bearing dampers dump damping energy into a damping medium such as a gas or liquid. The gas or liquid which serves as the damping medium must be kept sufficiently cool to avoid interfering with the turbine operation. In the case of a gas damper, the required cooling may simply occur by the thru-flow of the gas. A hydraulic damper using liquid may require additional arrangements to provide sufficient cooling of the hydraulic fluid for proper operation.

Various electromagnetic active bearing dampers have been developed to compete with gas or hydraulic bearing dampers. These electromagnetic active bearing dampers have been magnetic attraction force dampers and eddy current dampers.

The force densities developed in magnetic attraction dampers are in the order of 200 to 300 lbs. per square inch (PSI), whereas the eddy current dampers have had force densities on the order of 1 to 4 PSI. Response time for the magnetic attraction dampers is relatively low because of the large inductance to resistance ratio for the excitation coil. A full force buildup may take from 20 to 200 milliseconds. The eddy current dampers can have full force build up in the range of 10 to 100 microseconds. Magnetic attraction dampers have practically no heat input into the moving part, whereas eddy current dampers can have up to 50 watts per square inch heat input. In other words, the low heat input to the moving part in a magnetic attraction damper has to be weighed against the slow response time, whereas the fast response time in the eddy current arrangement has to be weighed against the disadvantage of high heat input into the moving part.

A disadvantage common to numerous active bearing designs that the energy removed from the braking of the engine will then be wasted. In other words, the braking of the rotating shaft system produces only waste energy.

OBJECTS AND SUMMARY OF THE INVENTION

Accordingly, it is a primary object of the present invention to provide a new and improved damping methods.

A more specific object of the present invention is to provide such damping using electrical machine concepts (i.e., the known principles for operation of a motor/generator).

Yet another object of the present invention is to provide damping which utilizes the braking energy so as to reduce the amount of heat and so as to increase the system efficiency.

A still further object of the present invention is to provide damping with a structure which is relatively inexpensive and simple to construct.

Yet another object of the present invention is to provide damping using a damper which can also serve as an electrical generator and thereby avoid the need for a separate electrical generator.

The above and other objects of the present invention which will become more apparent as the description proceeds are realized by a method for damping orbiting of a shaft of a gas turbine. A rotor is rotated with the shaft. An input is supplied to a controller indicating that damping of shaft orbiting is desired. Power switches in an inverter under the control of the controller are selectively closed dependent on the input in order to selectively energize stator windings of a stator electromagnetically coupled to the rotor. Each of the stator windings is connected to at least one corresponding power switch. A tangential damping force is applied to the rotor as a result of the energizing of the stator windings such that orbiting of the shaft is dampened responsive to the input. The controller controls the amplitude and location of the tangential damping force responsive to the input.

A first technique of rotating the rotor is by having the shaft rotate an outer bearing race to which the rotor is fixed. For that arrangement, electrical power generated by the interaction of the rotor and stator may be supplied to a storage capacitor (or bank of storage capacitors) for powering useful loads (i.e., loads not simply in place in order to burn up the energy removed by the damping technique). Alternately, the electrical power generated by the interaction of the rotor and stator may simply be dumped into a resistor (i.e., supplied to a load simply used to dissipate or burn up the generated power).

As an alternative to having the rotor rotated by way of the outer bearing race, the rotor may be fixed to the shaft to rotate directly with the shaft. In that case, the rotor and stator serve as the generator for the gas turbine and generate power which is fed to a main electrical power system operated from the gas turbine.

The rotor construction may include permanent magnets which provide a fixed excitation field. Alternately, the rotor may be a stack of magnetic laminations and the rotor and stator operate by switched reluctance. A further alternative has a rotor with shorted windings mounted thereon.

The method may further include the steps of mounting the rotor to rotate with the shaft, mounting the stator in a position to electromagnetically couple to the rotor, connecting the inverter to the stator windings, connecting the controller to the inverter, and rotating the shaft.

BRIEF DESCRIPTION OF THE DRAWINGS

The above and other features of the present invention will be more readily understood when the following detailed description is considered in conjunction with the accompanying drawings where in like characters represent like parts throughout the several views and in which:

FIG. 1 shows a schematic of the mechanical and electrical parts of a first embodiment for carrying out the present invention;

FIG. 2 shows a simplified side view of a first rotor/stator structure according to the present invention;

FIG. 5 shows a third embodiment rotor/stator structure according to the present invention;

FIG. 6 shows variation of inductance for the arrangement of FIG. 5;

FIG. 7 shows a block diagram of various electrical circuits in the system;

FIG. 8 shows an inverter which could be used with the arrangements of FIGS. 2 and 3;

FIG. 9 shows an alternate inverter for use with the rotor/stator structures of FIGS. 2 and 3;

FIG. 10 shows an inverter which can be used with the arrangement of FIG. 5;

DETAILED DESCRIPTION

Figure 3:
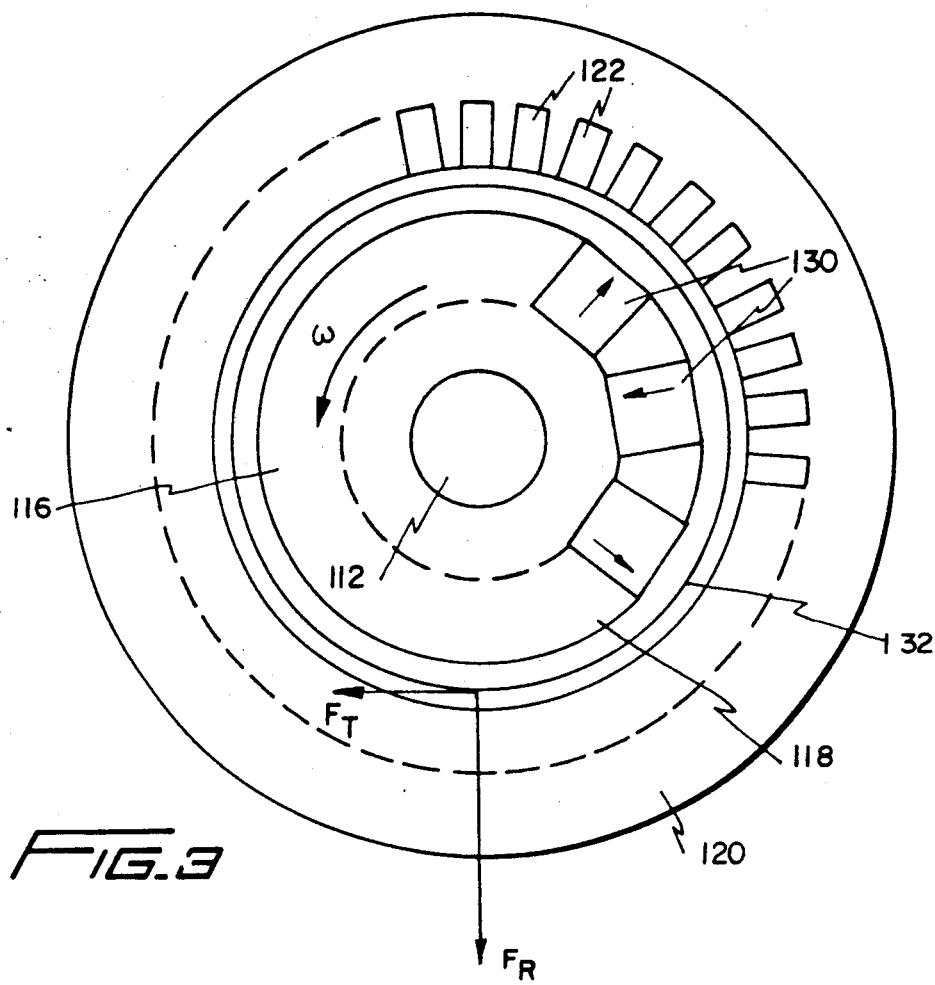
FIG. 3 shows a second embodiment rotor/stator structure.

A first embodiment damper arrangement 10 is shown in FIG. 1. The shaft 12 of a gas turbine engine rotates and orbits about an axis 12S in conventional fashion. The parts of the gas turbine engine other than the shaft 12 have not been illustrated as they would be conventionally constructed. Mounted to the shaft 12 is a bearing 14 which supports a portion of the shaft 12. The bearing 14 includes an outer race 16 and may be of generally conventional construction except that it includes a rotor 18 mounted thereon. The rotor 18 is fixed to the outer bearing race 16 which is spring-mounted to allow orbiting with movement of the shaft 12 as in conventional bearing dampers.

The rotor 18 cooperates with a stator 20 having windings 22. Together, the rotor 18 and stator 20 serve as an electrical damper/generator. The three phase A/C power from the windings 22 is fed into an electronic power inverter 24 which is controlled by a microprocessor controller 26. The output power from the inverter 24 may be handled in a number of fashions, which are not shown in FIG. 1. In particular, the output power could be fed to a resistor load or pumped back into the electrical system. The output power from inverter 24 used to supply the power input for the microprocessor controller 26 and for providing power for a switched reluctance machine (SRM) version of the rotor 18 and stator 20 as will be discussed in more detail below.

The microprocessor 26 receives signals from position sensors 28, there being at least two of the position sensors (only one is shown). An optional speed sensor (not shown) could also be used to provide input to the microprocessor. The microprocessor 26 and inverter 24 are operated based upon generally known principles such that the rotor 18 and stator 20 function essentially as a generator. However, the microprocessor 26 and inverter 24 control the stator 20 based upon the need to provide damping of the movement of shaft 12 as opposed to the need for generating electricity.

Although the principles of operation of the damper arrangement of FIG. 1 will be discussed in more detail below, an overview will be initially presented. Upon an aircraft pilot, other operator of a gas turbine, or even automatic control system determining that the gas turbine having shaft 12 has excessive orbital movement, it will be necessary to slow down the movement of shaft 12. The microprocessor controller 26 receives a damping input or command and selectively closes a series of power switches (not separately shown in FIG. 1) which are within the inverter 24 so as to energize the stator windings 22 and apply tangential damping force to stator 20. This also generates electrical power from the movement of the rotor 18 past the stator 20. The extraction of electrical power slows down the movement of the outer race 16 of bearing 14 and, by way of bearing 14, tends to slow down the movement of shaft 12. By operating the power inverter 24 based upon generally known principles so as to derive or generate a larger amount of electrical power from the rotation of rotor 18 relative to stator 20, one can increase the tangential braking force which is used to damp the movement of the shaft 12. The controller 26 controls the amplitude and location of the applied tangential damping force in response to the damping input (which input might simply indicate if damping was required or could contain data on the amount of damping required). The controller 26 may Control the damping by controlling the width of pulses applied to the stator windings, the rotor angle at which the pulses are applied, or the magnitude of the stator winding current. It should also be noted that the outer bearing race 16 would be spring mounted (spring not shown) in accord with generally known principles.

In addition to controlling the current amplitude and phase angle with respect to the rotor circumferential position (as sensed by the position sensors 28), the power inverter 24 may also operate to shape the power into an acceptable level for the electrical system. That is, if the power output of the inverter 24 is not simply dissipated in a resistor load, but is used to provide useful power, the inverter 24 may operate to insure that the power output can be used. The power inverter 24 basically operates as a linear amplifier from a control point of view. Its speed of response depends upon the power switching strategy. For a six step inverter, the response time can be as low as 2.5 milliseconds if the electrical machine defined by rotor 18 and stator 20 is a six pole machine configuration. For pulse width modulation (PWM) inverters, the response times will be in the range of 10 to 50 microseconds if the electrical machine design has low leakage inductances.

FIG. 2 shows a permanent magnet machine arrangement for the stator 20 and rotor 18. The bearing 14 surrounds the shaft 12 and includes an outer race 16 upon which the rotor 18 is mounted. The rotor 18 includes a series of circumferentially magnetized magnets 30 (orientation indicated by arrows and associated with letter M). Although the magnets 30 are distributed completely around the rotor 18, only three of the magnets have been shown for ease of illustration. The arrangement of FIG. 2 constitutes a flux squeezing arrangement which provides higher power densities for rare earth cobalt magnets of the 2-17 type and having an operating temperature capability of 250° to 275° centigrade. The magnets 30 are held in place by a retainer ring 32 and may have pole pieces such as 33 disposed in between adjacent magnets. The retaining ring 32 can be non-magnetic if a thickness of less than 0.1 inches provides sufficient strength under the circumstances of a particular design. If the thickness is greater than about 0.1 inches, the retaining ring 32 would be bimetallic with sections 34 made of different metals or materials. The section 34 directly radially outside of a magnet 30 would then be non-magnetic whereas the section of ring 32 directly outside of a pole piece 33 would be a magnetic metal or material. As the use of such retaining rings for such magnets is generally known, further construction details are unnecessary.

As shown in FIG. 2, the stator 20 includes a series of coils or windings 22 which extend circumferentially around the rotor (only some of the windings 22 have been illustrated). The windings 22 would be arranged in a three phase (or other multiphase stator arrangement).

As shown in FIG. 2, the electrical machine having rotor 18 and stator results in two force components applied to the rotor 18. In particular, a radial force $F_R$ is a force of attraction and a tangential force $F_B$ is a braking force. The amplitudes of these forces can be controlled to a certain degree independently. The tangential force is more readily controlled independent from the radial force then vice versa. For a normal electrical machine operation, the radial force is a force of attraction. However, depending upon the structure of the rotor 18 and stator 20 of FIG. 1, and the mode of operation, the radial force might be repulsive. The order of magnitude of the tangential or shear stress is 5 to 15 psi with the higher values obtained for large diameter machines. The radial stress level is in order of magnitude higher ranging from 80 to 200 psi maximum. The control of the force is accomplished by controlling the current. For machine types using separate excitation like permanent magnet (PM) machines such as FIG. 2, the force is linearly dependent upon the current. That is, the machine would be made to provide such a linear dependence.

Figure 4:
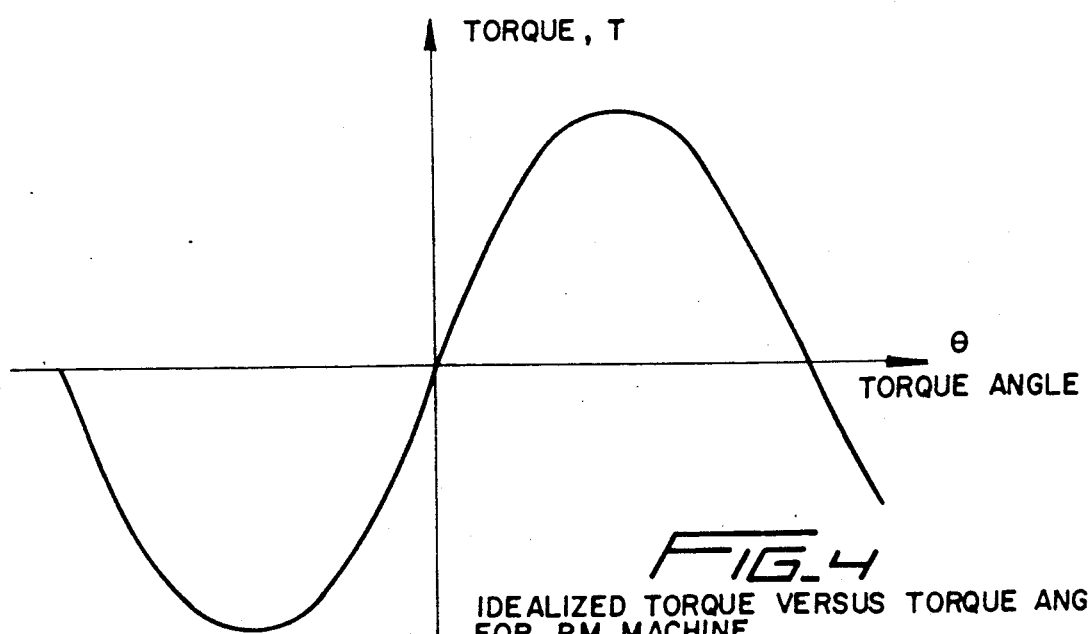
FIG. 4 shows the torque when using the rotor/stator structures of FIGS. 2 or 3.

The fixed excitation field provided by the permanent magnets interacting with the electrical currents in the three phase (or multiphase) stator winding produce the force components in the air gap. These are controlled by controlling the stator currents both in amplitude and phase angle relation to the known position of the rotor field. For constant phase angle with respect to the rotor, the tangential force, which is used to dampen shaft rotation, is fundamentally proportional to the applied current. Specifically, the following equation is applicable for the torque T:

$$T = K_t * i * \sin(\Theta) \quad \text{(Equation 1)}$$

where $K_t$ is a torque constant, i is the stator current, and $\Theta$ is the angle between the current and rotor position. This equation applies until severe saturation is reached for the limit of the normal operating range. For constant current, the torque changes sinusoidally with the angle between rotor pole and stator current as shown in FIG. 4.

The radial force has two components. The first component is due to the attraction of magnetic materials in a magnetic field and is proportional to the square of the flux density in the air gap. The second is due to the interaction between stator currents and magnets proportional to the product of magnetic excitation stator winding current component in phase with the magnet. For angles between current and magnet of more than 90°, this force component becomes negative or one of repulsion. For large enough currents, the total radial force may become repulsive.

FIG. 3 shows an alternate electrical machine structure which may be used with the overall arrangement of FIG. 1. The components of FIG. 3 have numbers in the 100 series with the same last two digits as the corresponding component in the electric machine structure of FIG. 2.

The FIG. 3 arrangement has a rotor 118 and a stator 120. The stator windings 122 are distributed in slots as with the embodiment of FIG. 2. The rotor 118 is mounted on the outer race 116 of a bearing around shaft 112 and includes permanent magnets 130 within retaining ring 132. The ring 132 could be bimetallic if desired. The permanent magnets 130 are different from those of FIG. 2 in that the magnets of FIG. 3 are neodymium iron boron magnets with radial orientation as illustrated by the arrows associated with the letters M. Again, the magnets would be distributed circumferentially completely around the outer race 116, but only three magnets are shown for ease of illustration. The magnets 130 of FIG. 3 are of higher power density than the magnets of FIG. 2. The useful temperature range of the magnets 130 is up to around 140° C. with a survivability temperature of 180° C.

The use of the permanent magnet (PM) machine designs of FIGS. 2 and 3 has several advantages. The rotor construction does not require any rotor windings and provides a very mechanically reliable rotor arrangement with little differences in thermal expansion coefficients suited or high peripheral velocity operation. Additionally, these designs provide low electrical losses, high power density/force density, and relatively simple tangential force control. The operation of these damper arrangements are relatively temperature insensitive in the accepted temperature range of operation. Although general orientation of the PM machine concept for the active bearing damper of the present invention is based upon a uniform force distribution, non-uniform force distribution around the stator periphery is possible by changing the stator current i (pulse width or amplitude) and/or the angle $\Theta$ (see equation 1 above).

FIG. 5 shows an alternate concept for realizing the rotor 18 and stator 20 of FIG. 1. In the embodiment of FIG. 5, components have numbers in the 200 series with the same last two digits as the corresponding component in the electrical machine structure of FIG. 2. The arrangement of FIG. 5 includes a rotor 218 and a stator 220. The rotor 218 would be mounted radially outside of an outer race of a bearing as shown for the rotor 18 of FIG. 1 or otherwise connected to rotate with the outer race of a bearing such as outer race 16 in FIG. 1 (race and connection not separately shown in FIG. 5).

The arrangement of FIG. 5 is a switched reluctance motor (SRM) design. More precisely, it is a variable reluctance stepper motor having the important features of switching angle control and a geometry optimized for efficient slewing. This allows one to provide efficient power conversion and use this machine concept as an active electromagnetic bearing damper. As shown, the stator has windings 222 around the 6 stator poles 236 (two each labeled A, B and C). For ease of illustration, windings are shown only around the poles A. The design of FIG. 5 includes four rotor poles 238. The stator 220 is a stack of magnetic laminations with windings 222 upon the poles 236. The windings on opposite poles are connected in series. The rotor 218 is very simply constructed of a stack of laminations having the four poles 238.

Turning the current in the coils on poles A off and turning the current on in the coils on poles B—B will cause a tangential and radial force between the stator poles B—B and the nearest rotor poles. Repeating this procedure with poles C—C will cause the rotation of the generated force. Thus, sequentially pulsing the stator windings will cause continuous force rotation with the pace of the electrical pulses controlled by an input control signal such as from a rotor position sensor.

As will be readily understood, the arrangement of FIG. 5 is simplified for ease of illustration and discussion. Preferably, there would be 48 or more of the stator poles 236 and 32 or more of the rotor poles 238. The ratio between the stator poles and the rotor poles would be maintained at 6 to 4.

As illustrated in FIG. 6, the inductance of the arrangement of FIG. 5 depends upon the rotor angle. In particular, and as shown in that figure, certain angles of rotation develop torque (where the inductance is increasing) and other angles (portions of FIG. 6 where the inductance is decreasing) correspond to a braking torque.

The torque for one set of poles in the embodiment of FIG. 5 is given in equation 2 with T as the torque, W as the magnetic energy, i as the instantaneous value of the current, and $\Theta$ as the angle between rotor and stator poles as follows:

$$T = \partial W / \partial \Theta |_i \qquad \text{(Equation 2)}$$

When the magnetic energy of equation 2 is linearized as per equation 3 below (L is the induction coefficient), the fundamental torque equation is given in equation 4 below:

$$W = (\tfrac{1}{2}) L i^2 \qquad \text{(Equation 3)}$$

$$T = (\tfrac{1}{2}) i^2 dL/d\Theta \qquad \text{(Equation 4)}$$

As shown above, the torque is independent of the direction of current. This allows for unidirectional current pulses in the windings and a very simple electronic switching circuit.

The general electrical arrangement for either the PM or SRM arrangement would be that shown in FIG. 7 including the controller or microprocessor 26, firing circuit 48, and solid state power switch circuit 50. The power switches of circuit 50 may be disposed in parallel to a bank of power capacitors (not separately shown in FIG. 7) for energy storage. The firing circuit 48, which may be of known design, translates the firing command from the controller into the appropriate signal levels for the power switches. The controller 26 is preferably a microprocessor programmed to derive the firing commands from the combination of sensed quantities of rotor position, current amplitude, and of the input commands for tangential force amplitude and location. The signal input to the internal controller includes signals corresponding to displacement and speed of the rotor.

The controller 26 may perform system and monitoring and protective functions such as checking for short circuits and other malfunctions as commonly done by such a controller. It also should have high speed computation capability to generate the firing commands so as to provide the necessary or desired amount of damping in rotation of the gas turbine. The damping would be dependent upon one or more input commands used to cause damping of a gas turbine shaft and which could be generated by one or more known techniques (operator or pilot activating damping and/or automatic control generated damping command). The damping force could be adjusted in magnitude by changing the angle of the stator pulse, the width of the stator pulse, and/or the stator current magnitude as shown from equations 1 and 4 above.

The power switches used for the power switch circuit 50 may be MOS controlled by thyristors (MCT) which feature high power density, switching times of one microsecond (or better), and 200° C. operating temperatures. The temperature limiting devices in the inverter will be the power capacitors with a temperature limit of 100° C. To avoid exceeding that limit, the electronics will be mounted at one of the cooler engine sections somewhat removed from the magnetic dampers.

FIG. 8 shows a rectifier - inverter for use with a three phase permanent magnet machine. As shown, the stator windings 22 are arranged in a star configuration. Each of the three illustrated phases corresponds to two pairs of power switches 40. The arrangement of FIG. 8 is a passive power operation and an optional filtering capacitor 46 may be included. By phase control of the controlled rectifier switches 40, this arrangement controls the power fed into a resistor 52 (which may be a plurality of resistors as needed to absorb the power). The amount of power is determined by the controller 26 (FIGS. 1 and 7) depending upon the force demand from the controller 26 and the load characteristics. In other words, the switches 40 are switched to draw power from the orbital movement of the permanent magnet system and to slow down the rotation of the shaft 12 and thereby brake the gas turbine operation. The maximum speed of response of the arrangement of FIG. 8 is one-half period of the AC voltage. Accordingly, a relatively high number of poles would be used for this configuration in order to provide a suitable response time. The attractiveness of this circuit lies in the simplicity of the electronics which does not require a capacitor (filtering capacitor 46 is optional). Additionally, this would be the smallest inverter which could be used. Limited controllability, slow speed of response, and the design, location, and cooling of the load resistor or resistors 52 may cause one to select an alternate inverter circuit as discussed herein.

The circuit of FIG. 9 is a pulse width modulator (PWM) inverter which provides full control capability. The switches 140 are protected by diodes 142 and are switched on and off to supply power to line 144 for storage on capacitor 146. The power stored may be used for powering useful loads from line 144 as opposed to simply burning the power off by dumping it into resistors such as resistor 52 in the FIG. 8 arrangement.

A simple three phase switching circuit for use with the embodiment of FIG. 5 is shown in FIG. 10. In particular, the switched reluctance machine (SRM) uses the inverter of FIG. 10 having the windings 222 (each of which corresponds to a series arrangement of windings on opposite of the stator poles 236 of FIG. 5). As shown in FIG. 10, each of the phases $\Theta_1$, $\Theta_2$, and $\Theta_3$ corresponds to a branch of the circuit and includes two switches 240 and two free - wheeling diodes 242. A line 244 is used to supply 270 volts to the circuit and a capacitor 246 is used for filtering and/or energy storage purposes.

For the switched reluctance machine (SRM) of FIG. 5, the direction of the tangential force components is controlled by the timing of the current pulse with respect to the rotor angle in order to achieve either braking or accelerating forces. For use as a damper, the timing would provide braking forces. The radial force generated in the machine would always be attractive. A change from the normally uniform force distribution around the rotor periphery can be achieved for multi-pole constructions.

The switched reluctance machine is simpler than the permanent magnet machine in construction. Its operating temperature limit is significantly higher and would be determined by the insulation material life and the magnetic flux carrying capability at high temperatures. It has, at least in principle, a higher peripheral velocity capability than the permanent magnet machine. The control of the forces requires more computation capability than in the permanent magnet machine. The overall losses are higher because of the switching of the magnetic fields in the rotor and the power density at the same peripheral velocity will at best be 90% of that of the permanent magnet machine.

The electrical power arrangements for both the PM and the SRM damper concepts is provided by a solid state power inverter which may be practically identical to those inverters commonly used for rotating machine concepts in traditional applications. By controlling the timing of turn-on and turn-off, the currents and thus the forces produced in the machines may be controlled. This in turn controls the amount of braking provided to the gas turbine having the shaft 12 in FIG. 1.

The SRM inverter of FIG. 10 allows independent phase operation and control and can easily be expanded to as many phases as are required. Thus, if a non-uniform force distribution along the shaft periphery is required, this can readily be accommodated by adding independent phases to the setup. Electrical excitation power needs to be supplied to the circuit since it does not contain any inherent self-excitation capability.

The FIG. 9 arrangement contains the same number of switching devices as the basic SRM inverter circuit of FIG. 10. However, the three phases are not independent in the arrangement of FIG. 9. That is, the smallest building block for the SRM inverter of FIG. 10 consists of two switches and two diodes, but the smallest building block for the PM inverter of FIG. 9 consists of six switches and six diodes. If more phases are required in the FIG. 9 arrangement, they will increase by three at a time. As these sets of three phases can be distributed only over small stator sectors, non-uniform force loading can be accommodated with several sets of three phases. The size of the DC link capacitor 146 of FIG. 9 is smaller than for the SRM inverter. Additional capacitor size reduction can be achieved through multiple sets of three phases operating out of phase with respect to each other.

Various factors may determine which of the above machine concepts are used in connection with the arrangement of FIG. 1. The switched reluctance machine is extremely simple in its construction and provides a damper with low manufacturing cost. The simple rotor (no windings and no permanent magnets) gives rise to highly reliable operation at high temperatures. The circuit configuration is significantly simpler than for other electronically commutated machine concepts even though the KVA rating of the power switching circuit is theoretically up to 30% higher than for the permanent magnet concepts discussed. The circuit has a potential for higher reliability because of fewer parts and shows a degree of fault tolerance which is difficult to achieve with other machine concepts. The flexibility of achieving the desired performance characteristics is similar to other electronic drives, while the basic control scheme is more complex. The limitations of this machine concept are the inherent torque ripple, the higher iron loss densities in the rotor (because it sees the same switched magnetic fields as the stator), the slightly lower power density capability than the best conventional drives, and for larger machines the higher KDA ratings for the power switches.

The permanent magnet machine concept as discussed above can be used with a variety of inverter circuits for the purpose of developing tangential forces for active magnetic bearing dampers. If necessary or desirable, radial forces could also be used for damping purposes. Advantageously, it provides linear torque current relationship, ease of electronic control, built-in permanent excitation, smooth torque generation, and high torque density. This PM design allows full four quadrant power control because negative currents create negative forces at a given angle between the rotor and current and because the angle can be shifted. This will allow operation of the PM machine in a region where repulsive forces between the rotor and stator can be created. (In contrast, repulsive forces in the SRM machine Would require that the SRM machine be implemented with a different rotor construction from that discussed above.) Among the limitations of the PM machine based damper are lower operating temperatures up to about 270° C., a more complex power inverter circuitry, and sensitivity to winding short circuits as the excitation cannot be shut off.

Both the SRM and PM damper arrangements may be built with many rotor poles in order to minimize the radial thickness of the damper. A PM machine damper having the same number of poles as the SRM damper will have half the frequency and this provides operational advantages for the pulse width modulator inverter for which the pulse frequency should be at least five times the machine frequency.

From the above, the preferred system for temperatures up to about 270° C. is the PM damper concept with pulse width modulation inverter. For higher temperatures, the SRM damper concept with pulse width modulator inverter would likely be preferred. Clearly, particular design considerations may lead to alternate selections depending upon the specific application.

One advantage of using the permanent magnet machine damper together with the full control PWM inverter of FIG. 9 is that the energy derived from braking of the gas turbine is utilized. In other words, the windings 122 of FIG. 9 serve as the stator windings of a generator and the useful energy is stored on capacitor 146 and may be fed back into other parts of the system (such as a controller 26 of FIGS. 1 and 8). Referring back to FIG. 1, and recalling that windings 122 of FIG. 10 would be positioned the same as windings 22 of FIG. 1, the braking action of FIG. 1 is accomplished indirectly in that using stator 20 and rotor 18 as a generator tends to brake the outer race 16 of bearing 14, which bearing is in turn connected to the shaft 12 of the gas turbine. The mounting of the rotor 18 on the outer race 16 limits the amount of energy which can be obtained from the arrangement of FIG. 1. This arrangement is suitable for damping purposes, but an alternate arrangement which will now be discussed with respect to FIG. 11 allowing one to obtain damping in combination with power generation.

In the previously discussed arrangement of FIG. 1, the rotor is mounted to a spring - mounted outer race of the shaft. This avoids placing a continuous drag on the shaft 12 of FIG. 1 which would result from the damping system if the damper was mounted directly on the shaft. Such a direct mounting would lower the turbine efficiency. This undesirable result is avoided by having the damper work on the spring - mounted outer race 16. However, in addition to the complication and cost for the spring - mounting of the bearing race 16, the location of the damper is fixed at the bearing 14 and this might not be the most effective damping location.

Figure 11:
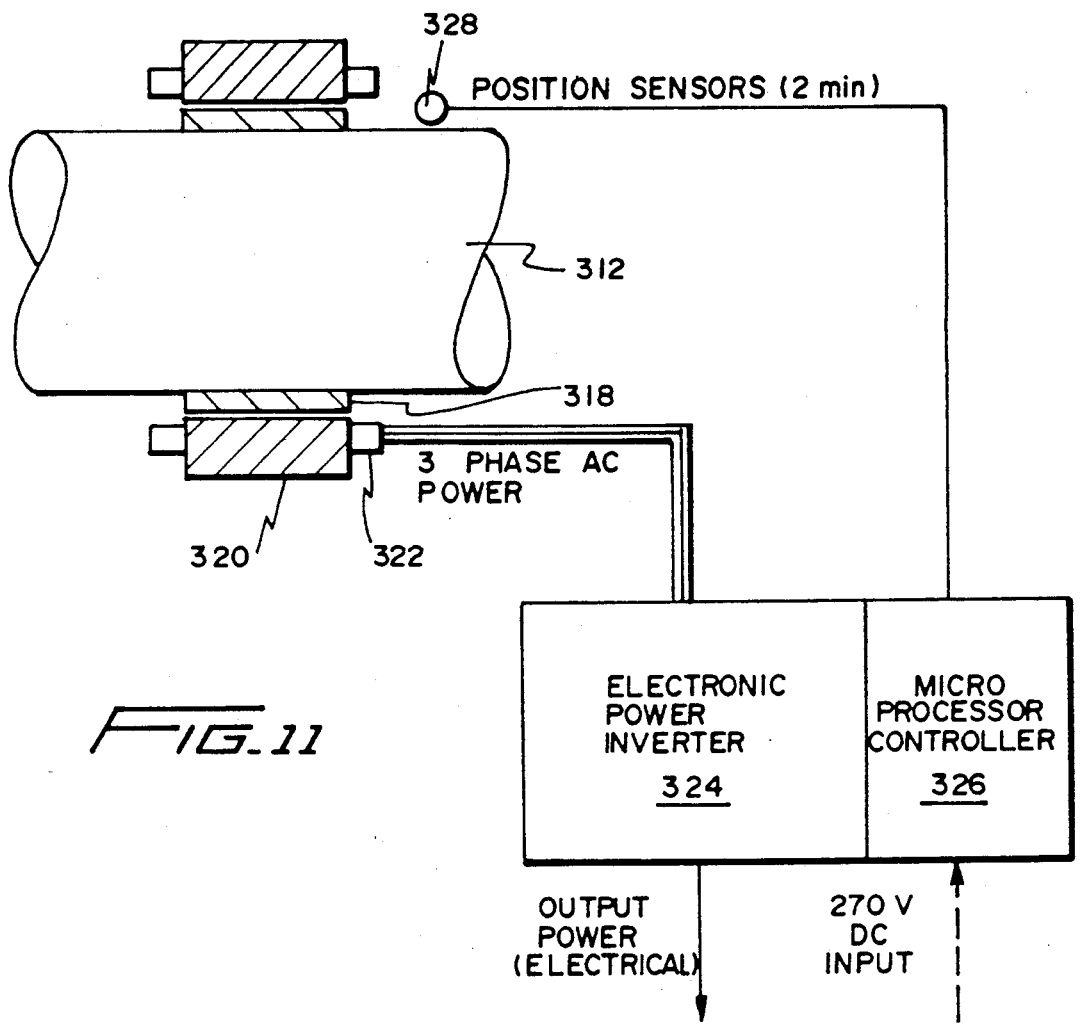
FIG. 11 shows a schematic of a second embodiment overall damper system for carrying out the present invention.

As an alternative to the arrangement of FIG. 1, FIG. 11 shows an arrangement wherein the damping system doubles as an electrical generator. In other words, instead of using a damping arrangement like that of FIG. 1 together with a conventional electrical generator (not separately shown in FIG. 1), the arrangement of FIG. 11 provides a system which combines these two functions. The components in the arrangement of FIG. 11 are in the 300 series with the same last two digits as the corresponding component in the arrangement of FIG. 1.

The arrangement of FIG. 11 shows a gas turbine shaft 312 having a rotor 318 mounted directly thereon for orbiting and rotation with the shaft 312. A stator 320 has windings 322 which feed power to an inverter 324. A controller 326, which is preferably a microprocessor as shown, receives signals from position sensors 328.

The arrangement of FIG. 11 uses the electrical machine of rotor 318 and stator 320 as a generator to provide the normal generation of electrical energy. In other words, this structure will serve both as a damper and as the generator for the usual generation of electrical energy commonly provided by a generator powered by a gas turbine shaft usually through a gear box. By using a common structure for both electromagnetic damping and for electrical generation, one may reduce the overall complexity of the system. In other words, a separate generator would be required in the arrangement of FIG. 1 if one wanted to provide electrical generation during normal operation. Such a separate generator is not required in the arrangement of FIG. 11. Additionally, the arrangement of FIG. 11 does not require the spring mounting of an outer bearing race (this reduces complexity and manufacturing cost). Further, the damping function may be provided at a location other than the bearing and this may provide a more effective damper. The size increase of the generator due to the damping function is believed to be nominal.

The structure of the rotor 318 could be permanent magnet (PM) or of the switched reluctance machine (SRM) type as discussed above. Likewise, the stator 320 could be structured in the same fashion as the stators discussed in the previous embodiments. Further, the inverter 324 and the controller 326 may be constructed and operated in the fashion discussed above except that the microprocessor controller 326 would, in addition to controlling the damping in the fashion as discussed with respect to the previous embodiments, control the generation of electrical power in known fashion in order to provide a source of electrical energy for the main power system.

Figure 12:
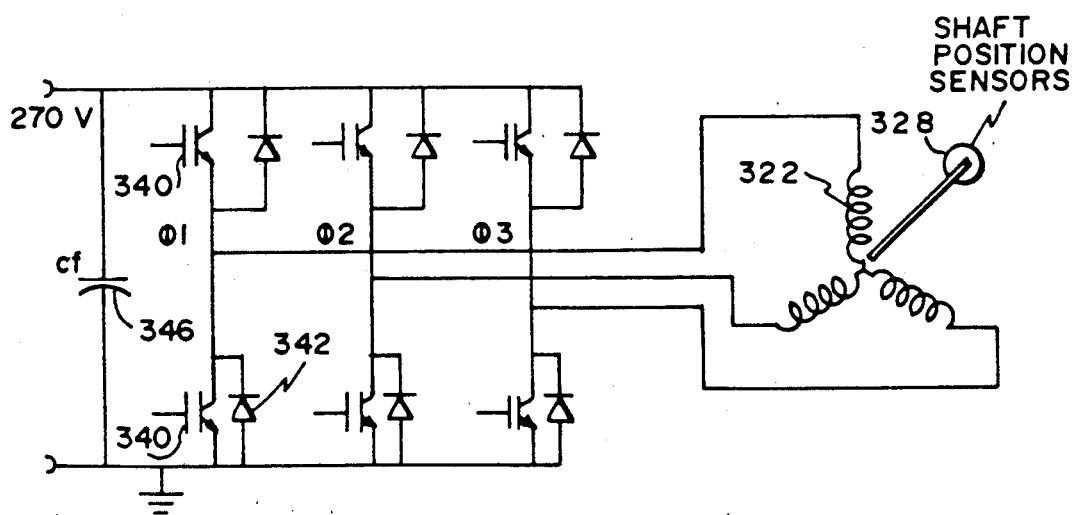
FIG. 12 shows an inverter arrangement which may be used with the system of FIG. 11.

Although the circuits discussed above with respect to the permanent magnet and switched reluctance machine concepts of FIGS. 1 to 10 could be used in implementing the arrangement of FIG. 11 and therefore need not be discussed in detail, a specific circuit will now be discussed with respect to FIG. 12. In particular, FIG. 12 shows an arrangement similar to that of FIG. 9. Power switches 340, diodes 342, and capacitor 346 each work in similar fashion to the component of FIG. 9 having the same last two digits. As shown in FIG. 12, shaft position sensors 328 are used in connection with this arrangement. In particular, one of the position sensors (they are not separately shown) would sense the rotation movement of the shaft 312 (shaft 312 is in FIG. 11 only), whereas the other of the shaft position sensors would sense the orbiting of the shaft. The sensing of the rotation of the shaft is used to control the electrical generation functions, whereas the sensing of the orbiting may be used to control the damping functions. Additional position sensors could be used if desired.

The sensors 328 would function in similar fashion to the sensors 28 of FIG. 1 except that the sensors 28 of course are sensing the position of the outer race 16 of FIG. 1 instead of sensing the position of the shaft 12.

Although any of the circuits discussed above with respect to controlling the embodiment of FIG. 1 could in theory be used in connection with the FIG. 11 arrangement, the arrangement of FIG. 8 would not be used in connection with FIG. 11 unless one was willing to forego the advantages of providing electrical generation from the damping structure. In other words, the circuit used as the inverter in connection with FIG. 11 should be one of the inverter circuits previously discussed which provide for energy storage and powering of useful loads.

Although the arrangement of FIG. 12 shows the position sensors 328, the same function might be provided by a known electronic circuit which may compute the rotor position from the measured voltages and currents at the machine. A measure for the response time of this arrangement is the pulsing frequency of the pulse width modulated inverter of FIG. 12. Modern switches like the preferred MOS controlled thyristors allow switching frequencies of up to 100 KHz which would translate into a potential response time of 10 microseconds. Alternate inverter concepts like the resonant link inverter might be used to reduce the size of the DC -link capacitor.

An alternate embodiment of the present invention will now be discussed with reference to FIG. 13 which has components in the four hundred series with the same last two digits as the corresponding component in the arrangement of FIG. 11 (which also correspond to a component in the embodiment of FIG. 1). A gas turbine shaft 412 has a rotor for 418 mounted directly thereon. A stator 420 includes coils 422 which supply power to an inverter 424. The inverter 424 is controlled by a controller 426, which is preferably a microprocessor. Position sensors 428 are used to sense the position of the shaft 412.

Figures 13, 14:
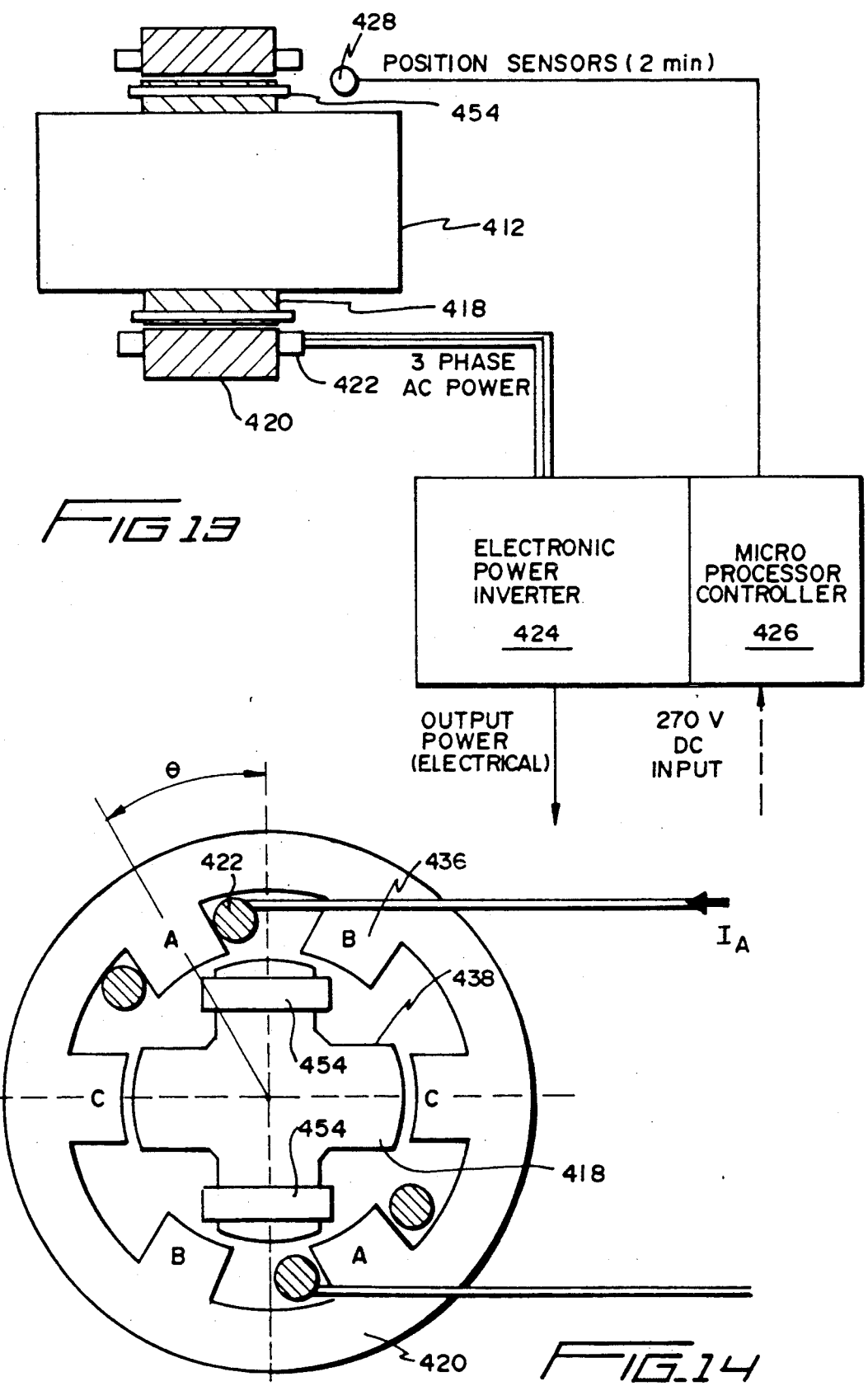
FIG. 13 shows a schematic of a third embodiment damper arrangement for carrying out the present invention.
FIG. 14 shows the rotor/stator structure used with the arrangement of FIG. 13.

The arrangement of FIG. 13 is different from that of FIG. 11 in that the rotor 418 includes coils 454. The switched reluctance machine having rotor 218 and stator 220 and discussed with respect to FIG. 5 is limited to producing radial forces of attraction. However, by use of fast electronic control loops, and to provide reliability and limited operating capability under partial fault conditions, it may be advantageous to provide a high temperature, electromagnetic damper system which relies on tangential repulsion forces rather than attraction. Accordingly, the arrangement of FIG. 13 will rely upon a previously known machine concept which is a variation on the switched reluctance machine. In particular, the arrangement of FIG. 13 would be identical to the switched reluctance machine previously discussed except that the rotor poles carry short circuited coils.

With reference now to FIG. 14, the rotor 418 is within the stator 420. The stator has windings 422 disposed on pole pieces 436. The connections of the windings 422 would be as discussed above in connection with the embodiment of FIG. 5. The rotor 418 of FIG. 14 has four pole pieces 438 having shorted windings 454 (only two shown, but there would be one on each rotor pole 438). The structure of FIG. 14 would be identical to that of FIG. 5 except that a shorted winding 454 would be mounted upon each of the rotor poles 438. The considerations for the number of stator poles 436 and the number of rotor poles 438 would be similar to that as discussed in connection with the FIG. 5 embodiment.

The operation of the arrangement of FIG. 14 would be similar to that as discussed above in connection with the FIG. 5 embodiment except that FIG. 14 uses forces of repulsion instead of forces of attraction. The arrangement of FIG. 14 would operate according to a curve like that of FIG. 6 except that the torque developed and braking torque portions of the curve would be in opposite positions from that of FIG. 6. In other words, the arrangement of FIG. 14 would have torque being developed as the inductance falls on the curve of FIG. 6 and would have braking torque occurring as the inductance rises on the curve of FIG. 6.

The arrangement of FIG. 13 shows the rotor windings 454 mounted to a rotor 418 which is in turn directly mounted to the shaft 412. In other words, this arrangement would serve the dual functions of damping and serving as the electrical generator as discussed in connection with the embodiment of FIG. 11. It will also be readily appreciated that the arrangement having rotor 418 with windings 454 mounted thereon and as shown in FIG. 14 could be used in an arrangement such as FIG. 1 wherein the rotor 18 is mounted to the outer race 16 of a bearing 14. In other words, the rotor structure 418 of FIG. 14 could be used in place of the rotor 18 of FIG. 1.

The operation of the arrangement of FIGS. 13 and 14 will be readily understood from the above discussion, but some additional comments herein may be useful. Turning on current in the pair of poles A and turning it off in the coils of the poles B will induce a heavy current in the two illustrated shorted windings 454. The interaction of stator and rotor currents will create a force of repulsion between the rotor and stator coils. If the time changing rate of the currents is high enough, this repelling force exceeds the reluctance is magnetic attraction between poles A and the two opposite poles upon which the windings 454 are shown. This causes the rotor to rotate until the rotor poles with the illustrated windings 454 are lined up with the stator poles B. Repeating this procedure with poles C will continue the rotation of the rotor. Thus, sequentially pulsing the stator windings will cause continuous rotor rotation with the pace of the electrical pulses controlled by a rotor position sensor. As a dampener, the pulsing of the stator would be used to decelerate the rotor 418.

The torque for one set of poles includes a reluctance torque which is defined by equation 4 given above in connection with the FIG. 5 arrangement, and a reactance torque defined by equation 5 below wherein $C_1$ and $C_2$ are constants:

$$T = -c_1 i (dL/d\Theta)(d(i\Theta)/dt)\sin(c_2\Theta) \quad \text{(Equation 5)}$$

Both torque components oppose each other, but are independent of the direction of the current such that unidirectional current pulses in the windings and a very simple electronic switching circuit may be used. In particular, the previously discussed circuit of FIG. 9 may be used. The reactance torque component is a function of the speed of rotation in the time changing rate of the stator current. The currents should be switched very fast if one wants to achieve power density similar to that obtained by the previously discussed embodiments. The reactance component will always exceed the reluctance torque causing the rotor to rotate in a direction opposite to that experienced in switched reluctance motors.

The direction of the tangential force components in the arrangement of FIG. 14 is controlled by the timing of the current pulse with respect to the rotor angle to achieve braking forces. (Accelerating forces could be applied by timing the pulses differently.) The radial force generated in this machine is always repulsive except for very slow speeds and slow current time changing rates. As discussed with respect to the earlier embodiments, a change from the normally uniform force distribution around the rotor periphery can be achieved for multipole constructions.

The use of the previously illustrated circuit of FIG. 9 in connection with the embodiment of FIG. 13 and 14 allows independent phase operation and control. Further, it can easily be expanded to as many phases as required or desirable. If a nonuniform force distribution along the shaft periphery is required or desirable, this can readily be accommodated by adding independent phases to the setup. Electrical excitation power needs to be supplied to the circuit since it does not contain any inherent self-excitation capability.

In the operation of the FIG. 14 embodiment, the use of the radially repulsive forces (as opposed to the usual attractive radial forces) is advantageous in that such repulsive forces provide a self-stabilizing system which may be attractive for emergency operating conditions as a fail safe system. The order of magnitude of tangential or sheer stress is 5 to 15 PSI with the higher values being obtained for large diameter machines. The radial stress level is an order of magnitude higher ranging from 80 to 200 PSI maximum.

The inverter 424 of FIG. 13 would control the current amplitude and phase angle with respect to the rotor circumferential position and provide an acceptable power level as required by the electrical system. The inverter 424 operates as a linear amplifier from a control point of view. The speed of response depends upon the power switching strategy. Fast inverters can achieve response times in the range of 10 to 50 microseconds for an electrical machine design with low leakage inductances. The inverter 424 would cooperate with the microprocessor 426 in similar fashion to the arrangement of controller 26, firing circuit 48 and power switches 50 of FIG. 7. Although not illustrated, the power switched by the switches would be provided to a bank of power capacitors for energy storage. The microprocessor 426 is programmed to derive the firing commands for a combination of the sensed quantities of rotor position, current amplitude, and input commands for force amplitude and direction. Additionally, the controller or microprocessor 426 would perform system monitoring and protective functions.

The shorted copper ring windings 454 of FIG. 14 would be used on a simple stack of laminations corresponding to the rotor 418 and including the poles 438.

The stator 420 would likewise be constructed as a stack of magnetic laminations. The rotor arrangement of FIG. 14 should provide highly reliable operation at high speed and high temperatures. The relatively low number of parts should help provide reliability and the arrangement should show a high degree of fault tolerance. The flexibility of obtaining the desired performance characteristics is similar to the other damping arrangements previously discussed, while the basic control scheme is more complex. Possible limitations in this design are the inherent torque ripple, the higher iron loss densities in the rotor (because it sees the same switched magnetic fields as the stator), a slightly lower power density capability than the best conventional drives, and, for larger machines, the higher KVA ratings for the power switches.

The assembly of the damping systems is relatively straightforward. Referring specifically to FIG. 1, but noting that the same basic steps would be involved in the FIG. 11 and FIG. 13 damping systems, the rotor 18 is mounted bearing race 16 and the stator 20 is mounted to electromagnetically couple to the rotor. Inverter 24 is connected (its power switches such as 40 in FIG. 8) to the stator winding 22 and controller 26 is connected to inverter 24.

Although various specific embodiments and constructions have been disclosed herein, it is to be understood that these are for illustrative purposes only. Various modifications and adaptations will be apparent to those of skill in the art. Accordingly, the scope of the present invention should be determined by reference to the claims appended hereto.

What is claimed is:

1. A method for damping orbiting of a shaft of a gas turbine comprising the steps of:
   orbiting a rotor with the shaft;
   supplying an input to a controller indicating that damping of shaft orbiting is desired;
   selectively closing power switches in an inverter under the control of the controller and dependent on the input to thereby selectively energize stator windings of a stator electromagnetically coupled to the rotor, each of the stator windings being connected to at least one corresponding power switch;
   applying a tangential damping force to the rotor resulting from the energizing of the stator windings such that orbiting of the shaft is dampened responsive to the input; and
   having the controller control the amplitude and location of the tangential damping force responsive to the input.

2. The method of claim 1 wherein the orbiting of the rotor is accomplished by the shaft orbiting an outer bearing race to which the rotor is fixed.

3. The method of claim 2 wherein the rotor includes permanent magnets which provide a fixed excitation field.

4. The method of claim 2 wherein the rotor is a stack of magnetic laminations and the rotor and stator operate by switched reluctance.

5. The method of claim 2 further comprising the step of supplying electrical power generated by the interaction of the rotor and the stator to a storage capacitor for powering useful loads.

6. The method of claim 3 further including the step of dumping electrical power generated by the interaction of the rotor and stator to a resistor.

7. The method of claim 1 wherein the rotor is fixed to the shaft to rotate directly therewith.

8. The method of claim 6 wherein the rotor and stator serve as the generator for the gas turbine, and further comprising the step of supplying electrical power generated by the interaction of the rotor and the stator to a main electrical power system operated from the gas turbine.

9. The method of claim 8 wherein the rotor includes permanent magnets which provide a fixed excitation field.

10. The method of claim 8 wherein the rotor is a stack of magnetic laminations and the rotor and stator operate by switched reluctance.

11. The method of claim 1 wherein the rotor includes a stack of magnetic laminations with poles having shorted windings thereon.

12. The method of claim 1 wherein the controller controls the location of the tangential damping force by controlling the rotor angle at which the power switches are closed.

* * * * *